United States Patent [19]

Scott

[11] Patent Number: 4,938,528
[45] Date of Patent: Jul. 3, 1990

[54] SEAT ASSEMBLY WITH INFLATABLE BLADDER HAVING A SINGLE NON-REVERSIBLE PUMP FOR INFLATING AND DEFLATING THE BLADDER

[75] Inventor: Glenn Scott, Ann Arbor, Mich.

[73] Assignee: Hoover Universal, Inc., Ann Arbor, Mich.

[21] Appl. No.: 343,731

[22] Filed: Apr. 27, 1989

[51] Int. Cl.$^5$ .............................................. A47C 7/46
[52] U.S. Cl. ................................. 297/284; 297/DIG. 3
[58] Field of Search .......................... 297/284, DIG. 3

[56] References Cited

U.S. PATENT DOCUMENTS 3,608,961  9/1971  Von Heck .............. 297/DIG. 3 X
3,867,732  2/1975  Morrell .................. 297/DIG. 3 X
4,840,425  6/1989  Noble ..................... 297/DIG. 3 X

*Primary Examiner*—Gerald A. Michalsky
*Attorney, Agent, or Firm*—Harness, Dickey & Pierce

[57] ABSTRACT

A seat assembly with an inflatable bladder for adjustable seat support having an air delivery system for both inflating and deflating the bladder. The air delivery system includes a single, one-directional pump and valve means selectively operable to communicate the pump outlet with the bladder and the pump inlet with atmosphere for inflating the bladder and selectively operable to communicate the pump inlet with the bladder and the pump outlet with atmosphere to deflate the bladder.

10 Claims, 5 Drawing Sheets

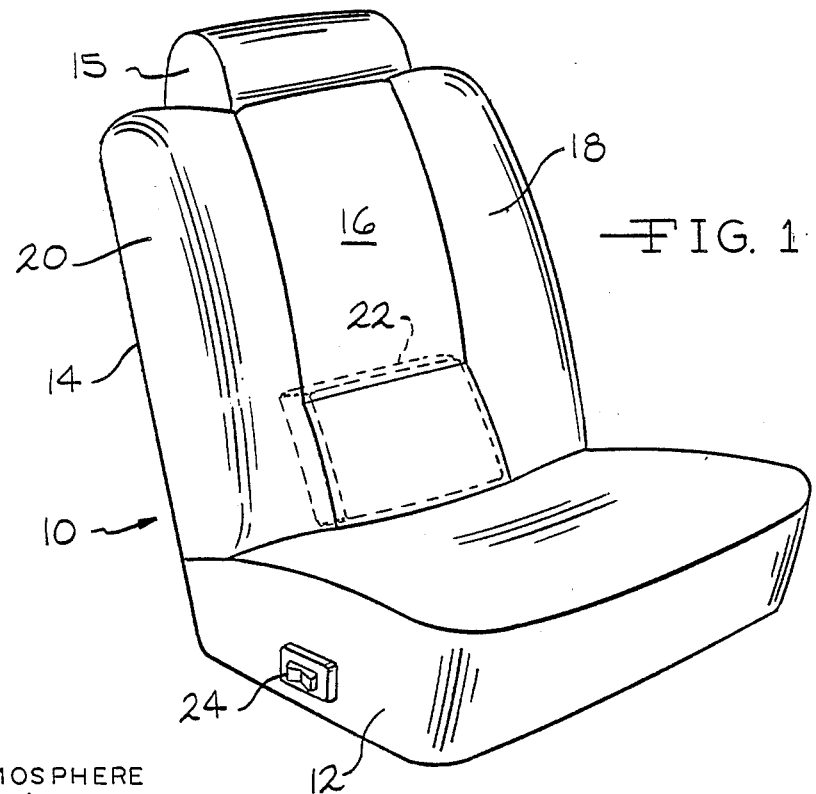
FIG. 1
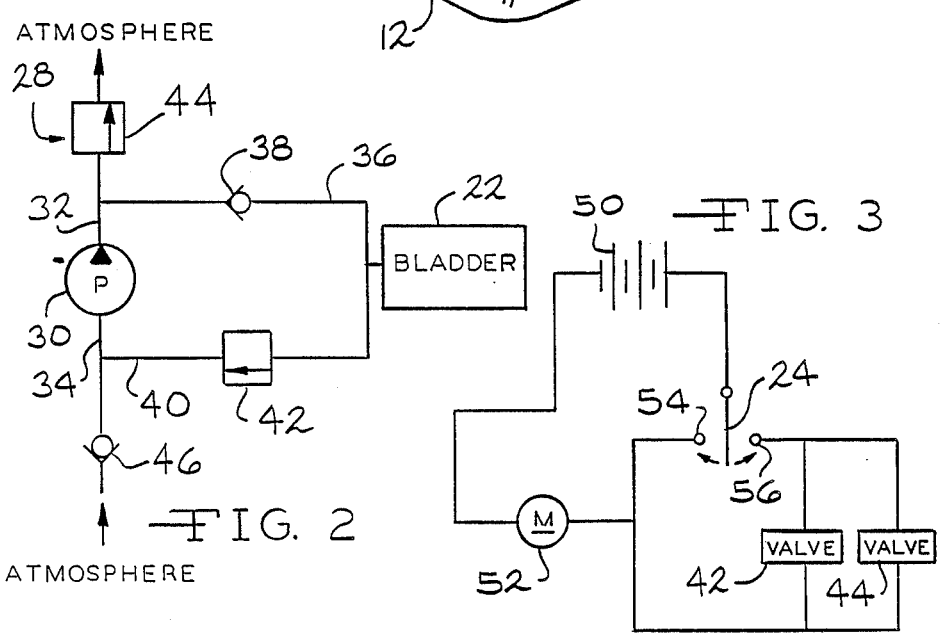
FIG. 2
FIG. 3

SEAT ASSEMBLY WITH INFLATABLE BLADDER HAVING A SINGLE NON-REVERSIBLE PUMP FOR INFLATING AND DEFLATING THE BLADDER

BACKGROUND AND SUMMARY OF THE INVENTION

This invention relates to a vehicle seat assembly having an inflatable bladder in the seat to provide adjustable support for the seat occupant and in particular to an improved air delivery system for inflating and deflating the seat bladder having a single, non-reversible pump for both inflating and deflating the bladder.

It is well known in the art to provide inflatable bladders in vehicle seat assemblies for enabling the seat occupant to adjust the support provided by the seat as desired. Seat bladders are generally inflated by either a hand actuated pump or by an electric motor driven pump. The bladders are often deflated simply by venting the bladder to the atmosphere. To sufficiently deflate the bladder, it is generally necessary for the seat occupant to apply pressure to the bladder. Depending upon the location of the bladder within the seat assembly, it can be cumbersome for the occupant to apply the necessary pressure to fully deflate the bladder.

Accordingly, air delivery systems have been developed which utilize a pump to deflate the bladder. One way to deflate the bladder with a pump is to provide a second pump. In such a system, there is one pump dedicated to inflating the bladder and a second pump dedicated to deflating the bladder. Alternatively, a single reversible pump can be used to both inflate and deflate the bladder as described in U.S. Pat. No. 4,707,027 With a reversible pump, the air flow direction through the pump is reversed by a control switch. Both of these systems which use a pump to deflate the bladder, have their disadvantages. The two pump system has the added expense of the second pump. A reversible pump is more expensive than a one-directional pump and is less efficient. Because it is less efficient, a larger motor is required to produce the same amount of air pressure and volume flow as a one-directional pump.

Accordingly, it is an object of the present invention to provide a vehicle seat having an inflatable bladder with a single, one-directional pump for both inflating and deflating the bladder.

It is an advantage of the present invention that the air delivery system cost is reduced by use of a single, one-directional pump versus two pumps or a reversible pump.

It is a further advantage of the present invention, that the pump efficiency of a one-directional pump is greater than the efficiency of a reversible pump.

The air delivery system of the present invention utilizes a single, one-directional pump to both inflate and deflate the bladder. The pump outlet is connected to the bladder through a pump outlet conduit while the pump inlet is connected to the bladder through a pump inlet conduit. One or more valves are used to selectively connect the pump outlet to the bladder for inflating the bladder and to selectively connect the pump outlet to atmosphere when the bladder is being deflated. Likewise, one or more valves are provided in the pump inlet conduit to selectively connect the pump inlet to the bladder for deflating the bladder and to selectively connect the pump inlet to atmosphere for inflating the bladder.

The air delivery system also includes an electrical control circuit for operating the valves and the motor used to drive the pump. The control circuit includes a single pull, double throw switch which is open in the rest position. When the switch is moved to one closed position, the motor is energized and the appropriate valves are opened to communicate the pump outlet to the bladder and the pump inlet to atmosphere. In the other closed position of the switch, the motor is energized and the appropriate valves are opened to connect the pump inlet to the bladder and the pump outlet to atmosphere for deflating the bladder.

The air delivery system may include one or more spring biased check valves which are normally closed instead of electrically actuated valves. The check valves are opened by air pressure or vacuum from the pump to allow air flow therethrough.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat assembly having an inflatable lumbar support bladder;

FIG. 2 is a pneumatic schematic an air delivery system for inflating and deflating the bladder of this invention;

FIG. 3 is an electrical schematic for operation of the air delivery system shown in FIG. 2;

DETAILED DESCRIPTION OF THE PREFERRED EMBODIMENT

Figure 4:
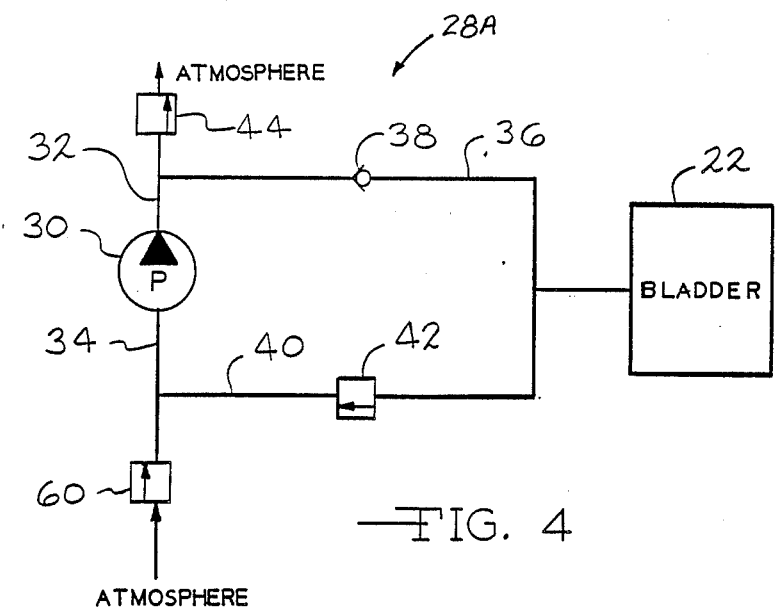
FIG. 4 is a pneumatic schematic of a modified form of the delivery system of the present invention.

A vehicle seat having an inflatable bladder with a single, one-directional pump for inflating and deflating the bladder is shown in FIG. 1 and designated generally at 10. The seat assembly 10 includes a lower seat cushion 12 and a seat back 14 extending upwardly from the rear of the cushion 12. Extending from the top of the seat back 14 is a head rest 15. The seat back 14 includes a center section 16 and a pair of side bolsters 18 and 20. The lower end of the seat back center section 16 is equipped with an inflatable bladder 22 to provide adjustable lumbar support for the seat occupant. The bladder 22 is inflated and deflated by a non-reversible, one-directional air pump. The air pump is actuable by a switch 24 disposed along the side of seat cushion 12.

FIG. 2 shows a pneumatic schematic of one embodiment of the air delivery system 28 used to inflate and deflate of the bladder 22. Air delivery system 28 includes a one-directional air pump 30 having an air outlet 32 and an air inlet 34. The bladder 22 is connected to the pump outlet 32 by a outlet conduit 36. The outlet conduit 36 includes an outlet conduit check valve 38 which restricts flow of air in the outlet conduit to flow in a direction from the pump outlet to the bladder. Air pressure produced by the pump overcomes the check valve 38, opening the valve to allow air to flow from the pump into the bladder. During inflation of the bladder, ambient air is drawn into the pump inlet 34 through an inlet check valve 46.

After inflating the bladder, the outlet conduit check valve 38 closes, preventing air within the bladder from escaping through the outlet conduit 36. A bleed-off valve can be incorporated into the check valve 38 to limit air pressure in the bladder by venting the pressure conduit 36 to atmosphere if the air pressure within the bladder exceeds a predetermined value.

An inlet conduit 40 is provided between the bladder 22 and the pump inlet 34 to enable the pump to be used as a vacuum source to draw air from the bladder 22 to deflate the bladder. An inlet conduit valve 42 is disposed in the inlet conduit 40 between the bladder and the pump inlet. The inlet conduit valve 42 is a two-way, two-position solenoid valve which is normally in its closed position in which the flow of air from the bladder to the pump inlet is blocked.

A pump outlet valve 44 is connected to the pump outlet 32 and is also a two-way, two-position valve like the inlet conduit valve 42. The valve 44 is normally closed and can be selectively moved to the open position in which the pump outlet 32 is in communication with atmosphere to vent the air from the pump to atmosphere.

To deflate the bladder 22, the inlet conduit valve 42 and the pump outlet valve 44 are both actuated to their open positions, enabling the pump 30 to draw air from the bladder and exhaust the air to atmosphere. The outlet conduit check valve 38 and the pump inlet check valve 46 both remain closed to prevent atmospheric air from being drawn into the pump and to prevent the pump outlet air from returning to the bladder 22.

An electric schematic for operation of the air delivery system 28 is shown in FIG. 3. The electrical system includes a power source 50, which is typically the vehicle battery, and an electric motor 52 to drive the pump 30. The switch 24 is a single pole double throw switch having contacts 54 and 56. The switch 24 has an open rest position shown in FIG. 3. When the switch 24 is moved into engagement with contact 54, the motor 52 is energized by the power source for inflating the bladder 22 as described above. Conversely, when the switch 24 is moved into engagement with the contact 56, the inlet conduit valve 42 and the outlet valve 44 are both opened along with the motor 52 being energized to operate pump 30. The pump now draws air from the bladder 22 to deflate the bladder and exhausts the air to atmosphere through outlet valve 44. Both valves, when disconnected from the power source 50, are returned to their closed positions.

The present invention provides an inflatable bladder for a vehicle seat which utilizes a single pump to both inflate and deflate the bladder. The air delivery system of the invention is advantageous in that the pump utilized is a non-reversible, one-directional pump which is less expensive and more efficient than a reversible pump.

It is to be understood that the present invention is useful with seats employing more than one inflatable bladder, such as bladders positioned within the two side bolsters 18 and 20.

Alternative embodiments of the air delivery system shown in FIGS. 2 and 3, are shown in FIGS. 4.15. In these various embodiments, like numerals are used to refer to like components. FIG. 4 shows a pneumatic schematic of the modified air delivery system 28A in which the pump inlet check valve 46, shown in FIG. 2, has been replaced by a two-way, two-position solenoid valve 60. Valve 60 is normally closed and is actuated by the switch 24 to the open position when the pump 30 is energized to inflate the bladder 22. When open, the inlet valve 60 communicates the pump inlet 34 with atmosphere to enable atmospheric air to be drawn into the pump for inflation of the bladder 22. The remaining valves in the air delivery system 28A are identical to those in air delivery system 28 shown in FIG. 2, and operate in the same manner. The replacement of the check valve with the solenoid valve 60 reduces the load on the pump 30 required to open the check valve 46 and improves the pump performance.

Figure 5:
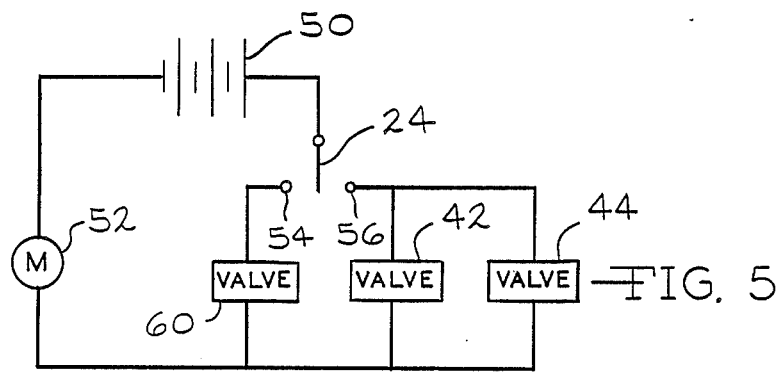
FIG. 5 is an electrical schematic for operation of the air delivery system shown in FIG. 4.

FIG. 5 shows an electrical schematic for operation of the air delivery system 28A. The valve 60 is actuated when the switch 24 is moved into engagement with contact 54.

Figure 6:
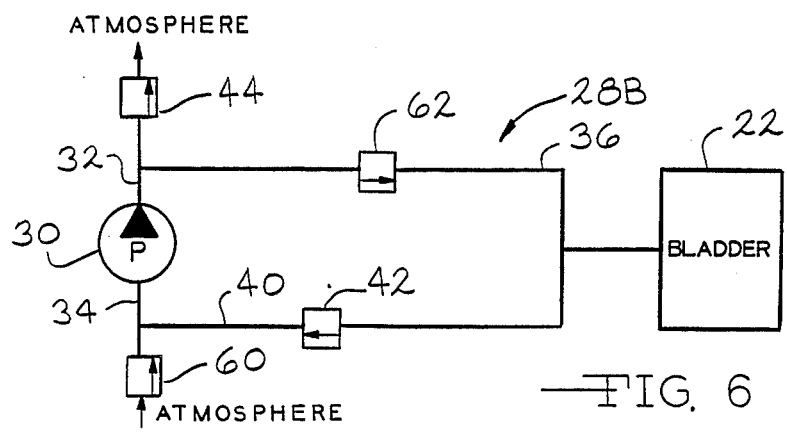
FIG. 6 is a pneumatic schematic of a modified form of the air delivery system of the present invention.

Another embodiment of the air delivery system is shown in FIG. 6 and designated 28B. The air delivery system 28B is identical to air delivery system 28A except that the outlet conduit check valve 38 is replaced with a two-way, two-position solenoid valve 62. The outlet conduit valve 62 and the inlet conduit valve 42 are both normally closed to seal the bladder 22 to retain the air therein. When the bladder 22 is to be inflated, both the pump inlet valve 60 and the outlet conduit valve 62 are actuated to their open positions to enable the pump 30 to draw air from the atmosphere and direct the air to the bladder 22. The replacement of the check valve 38 with the solenoid valve 62, further reduces the load on the pump 30 improving pump efficiency.

Figure 7:
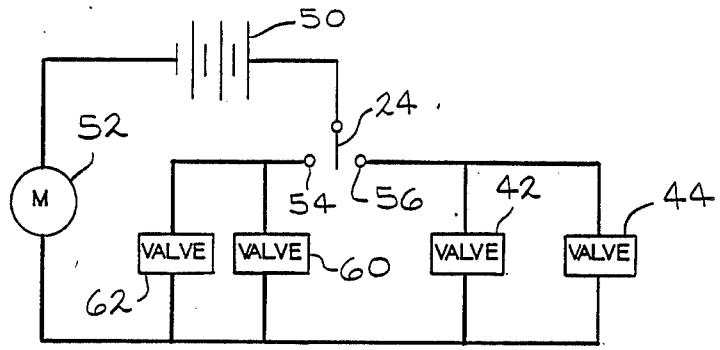
FIG. 7 is an electrical schematic for operation of the air delivery system shown in FIG. 6.

FIG. 7 shows the electrical schematic for control of the air delivery system 28B of FIG. 6. The pump inlet valve 60 and the outlet conduit valve 62 are both actuated when the switch 24 is moved into engagement with contact 54. The inlet conduit valve 42 and the pump outlet valve 44 both operate as described above.

Figure 8:
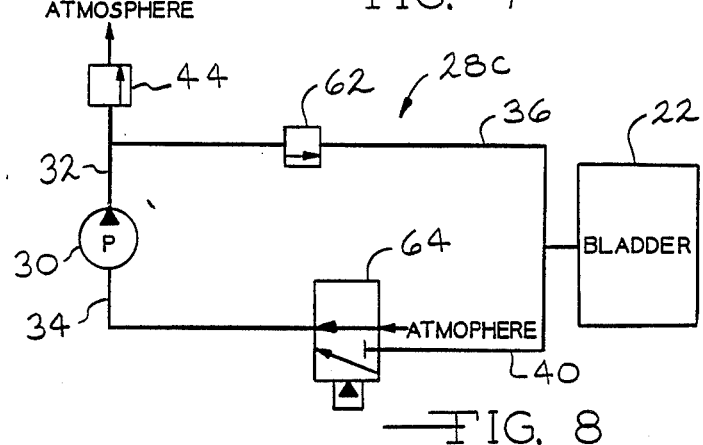
FIG. 8 is a pneumatic schematic of a modified form of the air delivery system of the present invention.

Another embodiment of the air delivery system is shown in FIG. 8 and designated as 28C. Air delivery system 28C differs from air delivery system 28B in that the inlet conduit valve 42 and the pump inlet valve 60 have been replaced by a single, two-position, three-way valve 64. The inlet conduit valve 64 is normally in a first position as shown in FIG. 8. In this first position, the pump inlet 34 is in communication with atmosphere for enabling the pump to draw atmospheric air for inflating the bladder 22. The bladder side of the inlet conduit is blocked at the inlet conduit valve 64 to seal the bladder 22. When the bladder 22 is to be inflated, the pump 30 and the outlet conduit valve 62 are both actuated to enable the pump to direct air to the bladder 22. When the bladder 22 is to be deflated, the inlet conduit valve 64 and the outlet valve 44 are actuated. The inlet conduit valve 64 is moved to its second position in which the bladder 22 is in communication with the pump inlet 34 to enable air to be drawn from the bladder 22. The pump outlet valve 44 is open to exhaust air from the pump to atmosphere.

Figure 9:
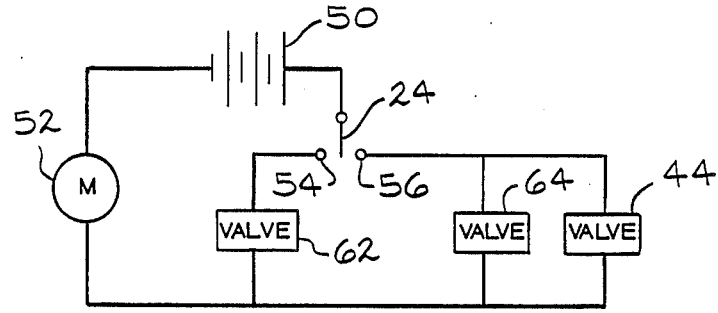
FIG. 9 is an electrical schematic for operation of the air delivery system shown in FIG. 8.

The electrical schematic of FIG. 9 shows the electrical control of the air delivery system 28C. The outlet conduit valve 62 is actuated along with motor 52 when the switch is moved into engagement with contact 54. The inlet conduit valve 64 and pump outlet valve 44 are actuated along with motor 52 when the switch is moved into engagement with contact 56.

Figure 10:
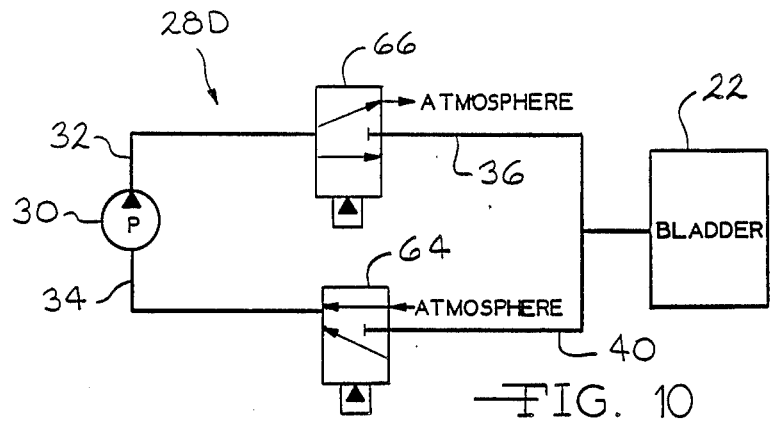
FIG. 10 is a pneumatic schematic of a modified form of the air delivery system of the present invention.

Another embodiment of the air delivery system is shown in the pneumatic schematic of FIG. 10 and designated as air delivery system 28D. Air delivery system 28D differs from air delivery system 28C in that the outlet conduit valve 62 and the pump outlet valve 44 have been replaced by a single, two-position, three-way valve 66 similar to the inlet conduit valve 64. The outlet conduit valve 66 has first and second positions and is shown in the first position in FIG. 10. Both valves 64 and 66 return to the positions shown in FIG. 10 when the power source is disconnected from the valves. In the first position, the pump outlet 32 is in communication with atmosphere through the outlet conduit valve 66. Both the pump inlet and outlet conduits to the bladder are closed at the valves 64 and 66 in the rest positions of the two valves. Valve 66 is actuated along with pump 30 to inflate the bladder 22. Upon actuation, the valve 66 is moved to its second position in which the pump outlet 32 is in communication with the bladder 22 for inflation of the bladder. To deflate the bladder 22, pump 30 is actuated along with the inlet conduit valve 64 being actuated to its second position in which the pump inlet 34 is in communication with bladder 22.

Figure 11:
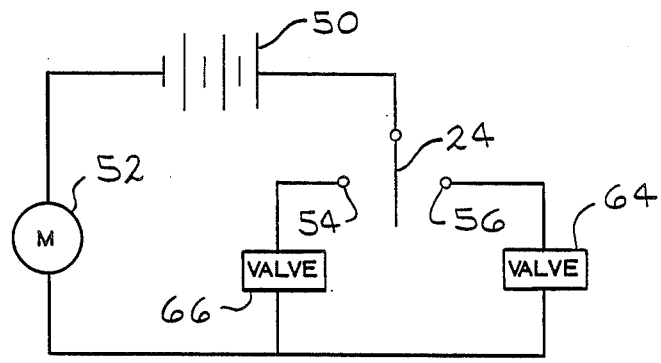
FIG. 11 is an electrical schematic for operation of the air delivery system shown in FIG. 10.

The electrical schematic of FIG. 11 illustrates the control circuit for the air delivery system 28D. The valve 66 is actuated when the switch 24 is moved into engagement with contact 54 and the valve 64 is actuated when the switch 24 is moved into engagement with contact 56.

Figure 12:
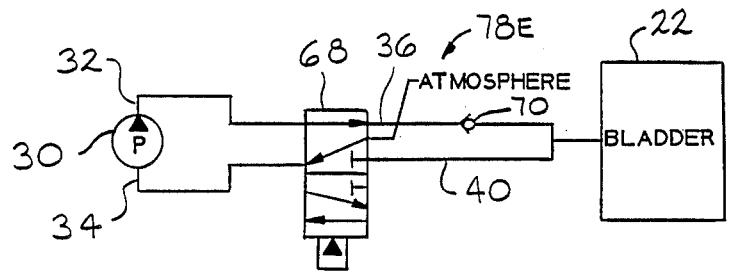
FIG. 12 is a pneumatic schematic of a modified form of the air delivery system of the present invention.

The pneumatic schematic of FIG. 12 illustrates another embodiment of the air delivery system designated 28E. In air delivery system 28E, the outlet conduit valve 66 and the inlet conduit valve 64 of air delivery system 28D have been replaced by a single, two-position, four-way valve 68. Valve 68 is shown in FIG. 12 in its normal first position in which the pump inlet 34 is in communication through valve 68 with atmosphere, and the outlet conduit 36 is open through the valve 68. An outlet conduit check valve 70 is positioned between the valve 68 and the bladder 22 for preventing leakage of air from the bladder 22 through the valve 68 and pump 30 to atmosphere. In operation to inflate bladder 22, the pump 20 is actuated and the air pressure from the pump opens the normally closed check valve 70 to enable air flow into the bladder 22. The bladder side of the inlet conduit 40 is blocked at the valve 68.

To deflate the bladder 22, the valve 68 is actuated to its second position in which the pump inlet 34 is now in communication with the bladder 22 through the now open pump inlet conduit 40. The pump outlet 32 is in communication through the valve 68 to atmosphere.

Figure 13:
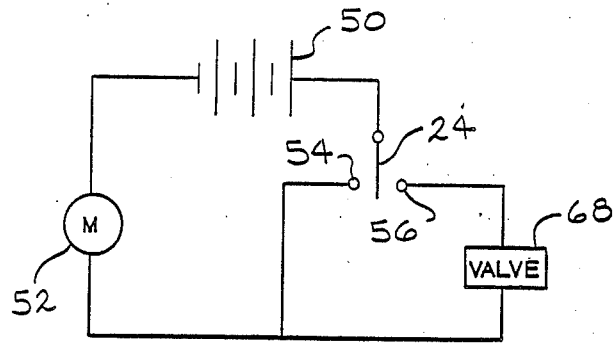
FIG. 13 is an electrical schematic for operation of the air delivery system shown in FIG. 12.

FIG. 13 illustrates an electrical circuit for operation of the air delivery system 28E in which the valve 68 is actuated when the switch is moved into engagement with contact 24.

Figure 14:
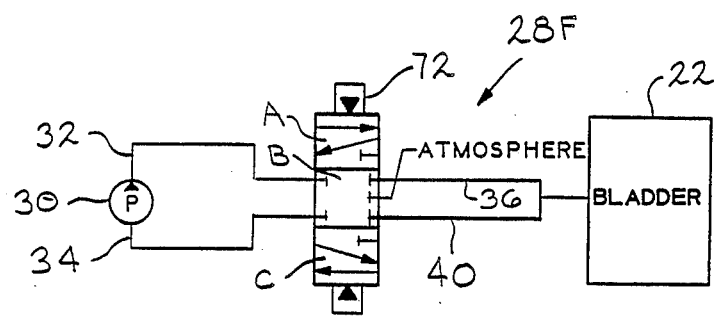
FIG. 14 is a pneumatic schematic of a modified form of the air delivery system of the present invention.

A final embodiment of the air delivery system is shown in FIG. 14 and designated as 28F. The air delivery system 28F differs from air delivery system 28E in that the check valve has been deleted and the valve 68 has been replaced by a three-position, four-way valve 72. The valve 72 is normally in the second position which is shown in FIG. 14 and designated as position B. In this position, both the outlet conduit 36 and the inlet conduit 40 are blocked at the valve 72 such that the bladder 22 is sealed to retain the air within the bladder 22. To inflate the bladder 22, the pump 30 is actuated and the valve 72 is actuated to the first position designated as A in which the inlet conduit 36 is open through the valve 72 and the pump inlet 34 is in communication with atmosphere through the valve 72. To deflate the bladder 22, the valve 72 is moved to the third position designated as C in which the inlet conduit 40 is open through the valve 72, communicating the pump inlet 34 with the bladder 22. The pump outlet 32 is in communication with atmosphere through valve 72.

Figure 15:
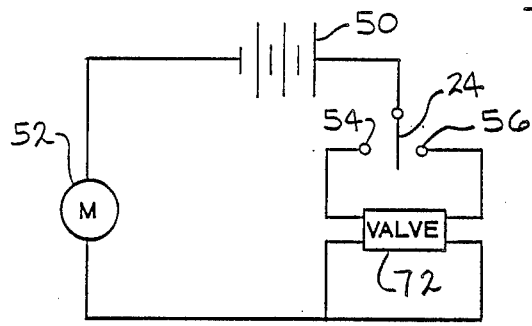
FIG. 15 is an electrical schematic for operation of the air delivery system shown in FIG. 14.

The electrical schematic shown in FIG. 15 is for operation of the air delivery system 28F. When the switch 24 is moved to engagement with contact 54, the valve is actuated to position A. When the switch 24 is moved into engagement with the contact 56, the valve 72 is actuated in the opposite direction to position C.

From the various embodiments of the air delivery system as illustrated and described above, it is clear that several different valve arrangements can be used to accomplish the objectives of the present invention of utilizing a single, one-directional air pump to both inflate and deflate a bladder. In each embodiment illustrated, the air delivery system operates to communicate the pump outlet with the bladder and the pump inlet with atmosphere to inflate the bladder and the air delivery system operates to communicate the pump inlet with the bladder and the pump outlet with atmosphere to deflate the bladder. Each embodiment provides the advantages of a pump deflated bladder with the efficiencies of a one-directional pump.

It is to be understood that the invention is not limited to the exact construction illustrated and described above, but that various changes and modifications may be made without departing from the spirit and scope of the invention as defined in the following claims.

What is claimed is:

1. A vehicle seat assembly having a lower seat cushion and a seat back extending upwardly from said seat cushion, comprising:
   at least one inflatable bladder disposed within said seat assembly, said bladder being selectively inflatable and deflatable as desired by a seat occupant; and
   air delivery means operatively associated with said bladder and selectively operable to inflate and deflate said bladder, said air delivery means including a single one-directional air pump having an inlet and an outlet, said pump outlet being selectively connectable to said bladder for inflating said bladder and said pump inlet being selectively connectable to said bladder for deflating said bladder.

2. A vehicle seat assembly having an inflatable bladder which is selectively operable to a desired firmness by a seat occupant and an air delivery system for inflating and deflating said bladder, said air delivery system comprising:

a one-directional air pump having an outlet and an inlet;

pump outlet conduit means operatively associated with said pump outlet and said bladder for selectively communicating said pump outlet with said bladder to enable flow of air from said pump outlet to said bladder for inflating said bladder;

pump inlet means operatively associated with said bladder and said pump inlet for selectively communicating said bladder with said pump inlet to enable flow of air from said bladder to said pump inlet for deflating said bladder;

said pump outlet conduit means being further operable for selectively communicating said pump outlet with atmosphere during deflation of said bladder; and said pump inlet conduit means being further operable for selectively communicating said pump inlet with atmosphere during inflation of said bladder.

3. The vehicle seat assembly of claim 2 wherein:

said pump outlet conduit means comprises an outlet conduit connecting said pump outlet to said bladder and outlet valve means operatively associated with said outlet conduit and said pump outlet for selectively directing air flow from said pump outlet to said bladder for inflating said bladder and for selectively directing air flow from said pump outlet to atmosphere during deflation of said bladder; and said pump inlet conduit means comprises an inlet conduit connecting said pump inlet to said bladder and inlet valve means operatively associated with said inlet conduit and said pump inlet for selectively directing air flow from said bladder to said pump inlet for deflating said bladder and for selectively directing air flow from atmosphere to said pump inlet during inflation of said bladder.

4. The vehicle seat assembly of claim 3, wherein:

said outlet valve means includes a check valve disposed within said outlet conduit for directing flow of air in said outlet conduit to flow in a direction from said pump outlet to said bladder for inflating said bladder and a two-way pump outlet vent valve operably connected to said pump outlet and having open and closed positions, said pump outlet vent valve being normally in said closed position and selectively operable to said open position to vent said pump outlet to atmosphere during deflation of said bladder; and said inlet valve means includes a two-way inlet conduit valve having open and closed positions disposed within said inlet conduit, said two-way inlet conduit valve being normally in said closed position and selectively operable to said open position to enable flow of air through said inlet conduit from said bladder to said pump inlet for deflation of said bladder, said inlet valve means further including a check valve operatively associated with said pump inlet to enable flow of atmospheric air into said pump inlet during inflation of said bladder.

5. The vehicle seat assembly of claim 3, wherein:

said outlet valve means includes a check valve disposed within said outlet conduit for directing flow of air in said outlet conduit to flow in a direction from said pump outlet to said bladder for inflating said bladder and a two-way pump outlet vent valve operably connected to said pump outlet and having open and closed positions, said pump outlet vent valve being normally in said closed position and selectively operable to said open position to vent said pump outlet to atmosphere during deflation of said bladder; and said inlet valve means includes a two-way inlet conduit valve having open and closed positions disposed within said inlet conduit, said two-way inlet conduit valve being normally in said closed position and selectively operable to said open position to enable flow of air through said inlet conduit from said bladder to said pump inlet for deflation of said bladder, said inlet valve means further including a two-way vent valve having open and closed positions operatively associated with said pump inlet, said two-way vent valve being normally closed and selectively operable to said open position for communicating said pump inlet with atmosphere to enable flow of atmospheric air into said pump inlet during inflation of said bladder.

6. The vehicle seat assembly of claim 3, wherein:

said outlet valve means includes a pair of two-way outlet valves having open and closed positions, said pair of outlet valves being normally in said closed positions, one of said pair of outlet valves disposed within said outlet conduit and selectively operable to said open position to enable flow of air from said pump outlet to said bladder for inflating said bladder, the other of said pair of outlet valves operatively connected to said pump outlet and selectively operable to said open position to vent air from said pump outlet to atmosphere during deflation of said bladder; and said inlet valve means including a pair of two-way inlet valves having open and closed positions, said pair of inlet valves being normally in said closed positions, one of said pair of inlet valves positioned in said inlet conduit and selectively operable to said open position to communicate said bladder with said pump inlet to enable air flow from the bladder to the pump inlet to deflate said bladder, the other of said pair of inlet valves operably connected to said pump inlet and selectively operable to the open position to communicate the pump inlet with atmosphere to enable air to flow from the atmosphere into the pump inlet during inflation of the bladder.

7. The vehicle seat assembly of claim 3, wherein:

said outlet valve means includes a pair of two-way outlet valves having open and closed positions, said pair of outlet valves being normally in the closed positions, one of said pair of outlet valves being disposed within said outlet conduit and being selectively operable to said open position to enable flow of air from said pump outlet to said bladder for inflating said bladder, the other of said pair of outlet valves operably connected to the pump outlet and selectively operable to said open position to vent air from the pump outlet to atmosphere during deflation of said bladder; and said inlet valve means including a three-way inlet valve disposed within said inlet conduit between the bladder and the pump inlet, said three-way inlet valve having first and second positions, said inlet valve in the first position communicating the pump inlet with atmosphere for allowing atmospheric air to flow into the pump inlet during inflation of the bladder and blocking the flow of air from said bladder through said inlet conduit, said inlet valve in the second position communicating the bladder with the pump inlet for enabling flow of air from the bladder to the pump inlet during deflation of the bladder.

8. The vehicle seat assembly of claim 3, wherein:

said outlet valve means includes a three-way outlet valve having first and second positions, said outlet valve disposed within said outlet conduit between the pump outlet and the bladder, said outlet valve in the first position communicating the pump outlet to atmosphere for deflation of the bladder and blocking the flow of air from said bladder through said outlet conduit, the outlet valve in the second position communicating the pump outlet with the bladder for inflation of the bladder; and said inlet valve means including a three-way inlet valve disposed within said inlet conduit between the bladder and the pump inlet, said three-way inlet valve having first and second positions, said inlet valve in the first position communicating the pump inlet with atmosphere for allowing atmospheric air to flow into the pump inlet during inflation of the bladder and blocking the flow of air from said bladder through said inlet conduit, said inlet valve in the second position communicating the bladder with the pump inlet for enabling flow of air from the bladder to the pump inlet during deflation of the bladder.

9. The vehicle seat assembly of claim 3, wherein:

outlet valve means and the inlet valve means comprises: a two-position, four-way valve disposed within both said outlet and inlet conduits, said four-way valve having first and second positions, in said first position said four-way valve communicating the pump outlet with the bladder and the pump inlet with atmosphere for inflation of the bladder, said valve in the second position communicating the pump outlet with atmosphere and the pump inlet with the bladder for deflating the bladder; and a check valve in the outlet conduit between said two-position, four-way valve and the bladder for limiting flow of air in the outlet conduit between the four-way valve and the bladder to flow in a direction from the four-way valve to the bladder.

10. The vehicle seat assembly of claim 3, wherein said pump outlet valve means and said pump inlet valve means comprises a four-way valve disposed within both said outlet and inlet conduits, said four-way valve having first, second and third positions, said valve in the first position communicating the pump outlet with the bladder and communicating the pump inlet with atmosphere, said valve in the second position closing the pump inlet and outlet conduits between the valve and the pump and closing the pump inlet and outlet conduits between the valve and the bladder, said valve in the third position communicating the pump outlet with atmosphere and the pump inlet with the bladder for deflation of the bladder.

* * * * *